(12) United States Patent
Duerr et al.

(10) Patent No.: US 7,197,143 B2
(45) Date of Patent: Mar. 27, 2007

(54) DIGITAL VIDEO AUTHENTICATOR

(75) Inventors: Thomas E. Duerr, Ellicott City, MD (US); Nicholas D. Beser, Owings Mills, MD (US); James H. Higbie, Catonsville, MD (US); Donna C. Paulhamus, Ellicott City, MD (US); Michael A. Karls, Muncie, IN (US); Cash J. Costello, Columbia, MD (US); George R. Barrett, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 709 days.

(21) Appl. No.: 10/345,919

(22) Filed: Jan. 16, 2003

(65) Prior Publication Data

US 2004/0022523 A1   Feb. 5, 2004

Related U.S. Application Data

(60) Provisional application No. 60/349,547, filed on Jan. 18, 2002.

(51) Int. Cl.
*H04N 1/44*   (2006.01)
*H04N 5/913*   (2006.01)
*H04N 5/919*   (2006.01)

(52) U.S. Cl. ............... 380/229; 380/230; 380/231; 380/232

(58) Field of Classification Search ......... 380/229–232
See application file for complete search history.

(56) References Cited

U.S. PATENT DOCUMENTS

| 5,136,646 A | 8/1992 | Haber et al. .................. 380/49 |
| RE34,954 E | 5/1995 | Haber et al. .................. 380/49 |
| 5,499,294 A | 3/1996 | Friedman ..................... 380/10 |
| 5,751,809 A | 5/1998 | Davis et al. .................. 380/23 |
| 5,764,769 A | 6/1998 | Bennett et al. ............... 380/23 |
| 5,870,471 A | 2/1999 | Wootton et al. .............. 380/10 |
| 5,898,779 A | 4/1999 | Squilla et al. ................ 380/23 |
| 5,907,619 A | 5/1999 | Davis ........................... 380/23 |
| 5,912,972 A | 6/1999 | Barton ......................... 380/23 |
| 5,960,081 A | 9/1999 | Vynne et al. ................. 380/10 |
| 5,966,446 A | 10/1999 | Davis ........................... 380/25 |

(Continued)

FOREIGN PATENT DOCUMENTS

WO   WO 2084990 A2 * 10/2002

*Primary Examiner*—Kambiz Zand
*Assistant Examiner*—Venkat Perungavoor
(74) *Attorney, Agent, or Firm*—Albert J. Fasulo, II

(57) ABSTRACT

The Digital Video Authenticator (DVA) addresses law enforcement concerns for a means to authenticate digital video (DV) so that it will be admissible and trusted as evidence in court. The DVA is a peripheral device attached to a commercial digital video recording device whose purpose is to generate and record authentication data simultaneously as DV is recorded by the video recording device. Verification of the authenticity of a DV sample will be accomplished using non-real-time software tools. The DVA system and method reads digital video (DV) data from a digital video recording device; parses the DV data into elements representing video, audio, control and timing data; and creates digital signatures that can be used to validate the original DV tape. The combination of secure digital signatures and repeatability of the DV data stored on tape provides the basis for proving the original video has not been modified.

13 Claims, 12 Drawing Sheets

U.S. PATENT DOCUMENTS

| | | | |
|---|---|---|---|
| 6,047,374 A | 4/2000 | Barton | 713/150 |
| 6,064,739 A * | 5/2000 | Davis | 380/200 |
| 6,101,604 A | 8/2000 | Barton | 713/176 |
| 6,115,533 A | 9/2000 | Tahara et al. | 386/94 |
| 6,115,818 A | 9/2000 | Barton | 713/176 |
| 6,163,842 A | 12/2000 | Barton | 713/176 |
| 6,182,219 B1 | 1/2001 | Feldbau et al. | 713/176 |
| 6,192,139 B1 | 2/2001 | Tao | 382/100 |
| 6,209,090 B1 | 3/2001 | Aisenberg et al. | 713/28 |
| 6,266,429 B1 | 7/2001 | Lord et al. | 382/100 |
| 6,269,446 B1 | 7/2001 | Schumacher et al. | 713/176 |
| 6,289,108 B1 | 9/2001 | Rhoads | 382/100 |
| 6,295,407 B1 | 9/2001 | Tahara et al. | 386/94 |
| 6,392,665 B1 * | 5/2002 | Argabright et al. | 715/723 |
| 6,947,561 B1 * | 9/2005 | Faber et al. | 380/203 |

* cited by examiner

FIGURE 1
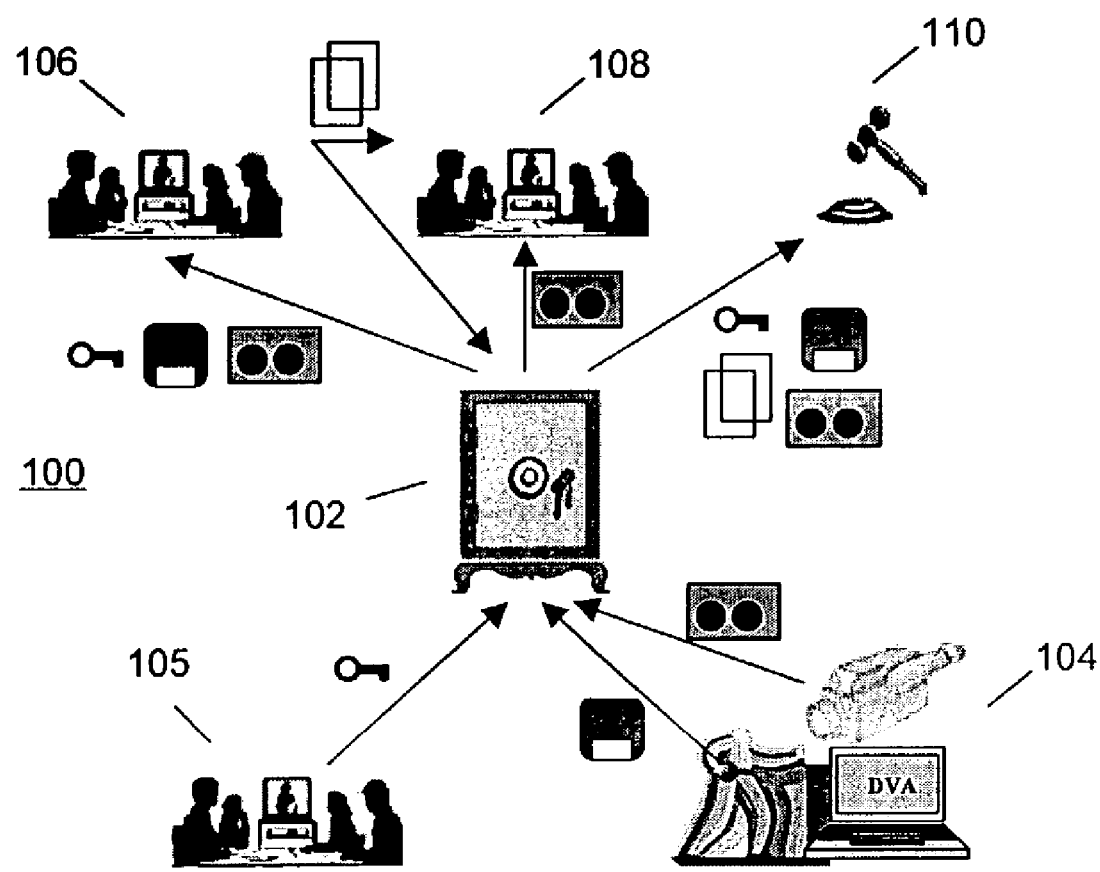
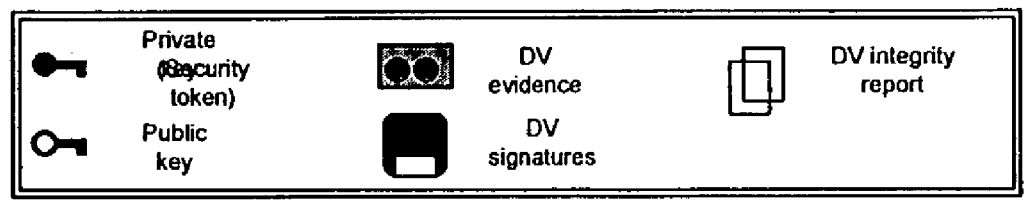

DVA INITIALIZATION

DVA NORMAL OPERATION

DVA NORMAL TERMINATION

DVA ABNORMAL CONDITIONS

DIGITAL VIDEO AUTHENTICATOR

CROSS REFERENCE TO RELATED APPLICATIONS

This application is related to and claims the benefit of U.S. Provisional Patent Application Ser. No. 60/349,547, filed Jan. 18, 2002 entitled "Digital Video Authenticator".

STATEMENT OF GOVERNMENTAL INTEREST

This invention was made with U.S. Government support under Army contract no. DAAD05-01-C-0021. The U.S. Government has certain rights in the invention.

BACKGROUND OF THE INVENTION

Law enforcement agencies commonly use digital video recording devices at crime scenes in order to record digital video representing evidence considered germane to a particular case. This evidence may be subsequently introduced in a judicial proceeding purporting to be a true and accurate reflection of what is contained on the digital videotape.

Unfortunately, digital data, such as digital video, can be altered or tampered with by unscrupulous persons to alter the perception of the digital video to serve some other purpose. As a result, introduction of such evidence may be subjected to challenges by the opposing side. Even if ruled admissible as a matter of law, opposing counsel may still seek to imply that it cannot be proven that the evidence was not subject to tampering.

What is needed is a means for determining the integrity of digital video data such that the judicial system can have confidence that what is brought to court is exactly what was originally recorded. This can be accomplished by applying a unique digital signature to each and every frame of digital video that is originally captured.

SUMMARY

The present invention comprises a system and method that provides a means for authenticating recorded digital video (DV). Authentication of DV is especially important in a judicial evidentiary proceeding. The goal is to eliminate the possibility of DV evidence being ruled inadmissible due to concerns over its authenticity or tampering.

The system utilizes a digital video authenticator (DVA) that can be coupled to most commercial digital video recording devices. An agent tasked to record digital video checks out a digital video recording device and a DVA. At the same time, the agent is issued a security token particular to that agent. When the agent is on-site and wants to record DV, he inserts the security token containing an RSADSA public/private key pair into the DVA. The DVA then uses the security token to generate ECDSA public/private key pair and an integrity certificate that includes the ECDSA public key that is digitally signed using the RSADSA private key on the security token. The integrity certificate is then stored on a removable storage medium. When the agent begins recording video using the digital video recording device, the DV is also passed to the DVA where it is buffered. The DVA then parses the DV frames into video, audio, and control blocks before digitally signing each frame of data using the ECDSA private key. The digital signatures are written to a removable storage medium.

To verify the integrity of a DV tape, it is first associated with the digital signature removable storage medium that was created at the time the video was recorded. The DV tape and the digital signature removable storage medium are analyzed on a frame-by-frame basis using the DV itself, the DV signatures on the digital signature removable storage medium, and the ECDSA public key. If the comparison for a particular frame does not pass muster then it cannot be certified as authentic.

BRIEF DESCRIPTION OF THE DRAWINGS

FIG. 1 illustrates a digital video (DV) evidence system in general.

DETAILED DESCRIPTION

Figure 2:
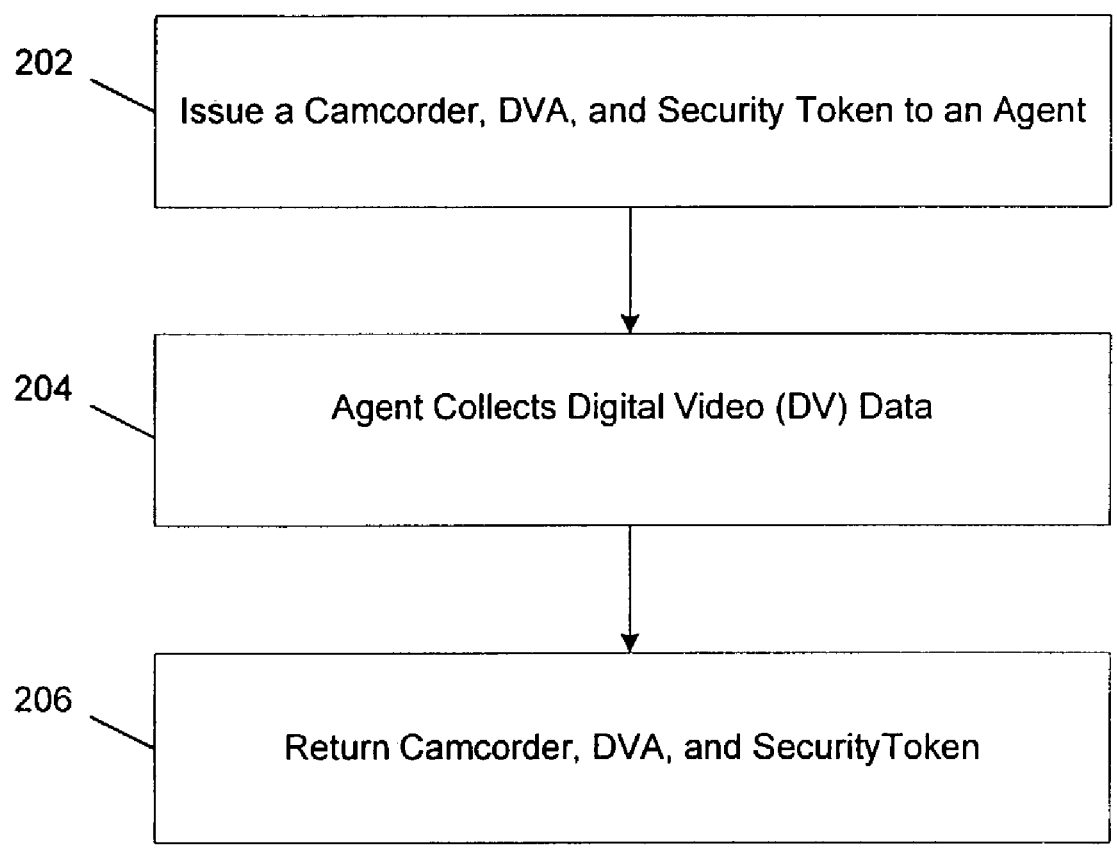
FIG. 2 is a flowchart showing how a DVA is used within a DV evidence system such as the one illustrated in FIG. 1.

Several acronyms are used throughout the text. For ease of reference, a table of these acronyms as well as a table of definitions of frequently used terms is provided below.

| Term | Definition |
|---|---|
| ACRONYMS | |
| API | Application Programming Interface |
| CA | Certificate Authority |
| CAW | Certification Authority Workstation |
| CONOPS | Concept of Operations |
| CTTSO | Combating Terrorism Technology Support Office |
| DES | Data Encryption Standard |
| DV | Digital Video |
| DVA | Digital Video Authenticator |
| ECDSA | Elliptic Curve Digital Signature Algorithm |
| FIPS PUB | Federal Information Processing Standards Publication |
| IEEE | Institute for Electrical and Electronics Engineering |
| IETF | Internet Engineering Task Force |
| JHU/APL | The Johns Hopkins University Applied Physics Laboratory |
| ms | Millisecond |
| NTSC | National Television Standards Committee |
| PCMCIA | Personal Computer Memory Card International Association |
| PIN | Personal Identification Number |
| PKCS | Public Key Cryptography Standard |
| PKI | Public Key Infrastructure |

-continued

| Term | Definition |
| --- | --- |
| RSA | Rivest Shamir Adleman |
| RSADSA | Rivest Shamir Adleman Digital Signature Algorithm |
| SP | Security Policy |
| SMPTE | Society of Motion Picture and Television Engineers |
| TSWG | Technical Support Working Group |
| USB | Universal Serial Bus |
| USPIS | United States Postal Inspection Service |
| VCR | Video Cassette Recorder |

DEFINITIONS

| | |
| --- | --- |
| Agent Certificate | A digital certificate linking an Agent to a public key, with contents and format in accordance with Internet Engineering Task Force (IETF) RFC 2459 (also known as X.509 certificate) |
| Asymmetric Cryptography | A class of cryptographic algorithms that use different but related keys for creating and verifying digital signatures |
| Authentic | Unchanged from the original |
| Authenticate | To show that, for example, DV data are unchanged from the original version |
| Clear Text | Delimited set of data that is not encrypted |
| Digest | Bit string obtained by applying any of several standard hash algorithms to clear text |
| Digital Signature | Encrypted hash of an input clear text |
| Hash | Function that generates a unique, fixed-bit-length digest for any input clear text |
| Integrity Certificate | A digital certificate linking an Elliptic Curve Digital Signature Algorithm (ECDSA) public key to an Agent Certificate, with contents and format in accordance with IETF RFC 2459 (also known as X.509 certificate) |
| Key | Generally, a bit string used in digital signature algorithms to digitally sign clear text |
| Metadata | Data that describe or provide information about other data |
| Private Key | In asymmetric cryptography, the key used to generate digital signatures |
| Public Key | In asymmetric cryptography, the key used to verify digital signatures |
| Security Token | Small, standardized device providing secure storage of cryptographic keys and limited digital signing functionality |
| Token | See Security Token |
| X.509 Certificate | A digital certificate with contents compliant with IETF RFC 2459 |
| Zeroize | To over-write data, especially cryptographic keys, with zeroes or random bits |

FIG. 1 illustrates a digital video (DV) evidence system 100 in general. There are four processes or phases of the DV evidence system that each has an information connection to a central evidence storage facility 102. The first process is DV collection 104. DV collection 104 utilizes a PKI system 105 in conjunction with a private key (security token) associated with a digital storage medium and digital signature medium. A DVA apparatus is coupled with a digital video recording device while the digital video recording device records images to be used as evidence. Once DV has been collected, the PKI, DV tape, and digital signature medium are all stored in the secure evidence storage facility 102. The other three processes include DV integrity verification 106, Investigative analysis 108, and courtroom presentation 110. Each of these processes is outside the scope of the present invention.

DV integrity verification 106 is the process by which the DV is validated frame by frame by comparing digitally signed image frames to the digital signatures for those frames. The DVA is the apparatus that applies the digital signature to each frame of DV. Investigative analysis 108 refers to conclusions drawn with respect to the probative value of the DV as it relates to the case at hand. Courtroom presentation 110 refers to the process by which DV evidence is introduced and used in a judicial proceeding.

The arrows of FIG. 1 indicate how information flows among the various system phases and processes. At the center of the figure is the secure evidence storage facility 102 as denoted by a safe. The secure evidence storage facility 102 stores DV evidence and other information bearing media related to the collection of DV evidence. PKI information and a corresponding private key (security token) that is associated with collected DV and a DV signature medium for a particular matter all reside within the secure evidence storage facility 102. The DV and a DV signature medium are a result of the evidence collection process that utilizes the DVA to digitally sign each frame of DV. The DV integrity verification process obtains data from secure evidence storage facility 102 and issues a report pertaining to the integrity of the DV. This report is also stored in secure evidence storage facility 102 prior to being presented in court, if necessary. The entire chain of custody for DV evidence can be traced back to the secure evidence storage facility 102 and the limited number of people that have access to it.

A Digital Video Authenticator (DVA) is an element of a larger DV evidence collection and control system. Other components, not fully described herein, include a public key infrastructure (PKI) for managing the cryptographic keys that are needed for the electronic chain of evidence; a security token, such as a smart card, for private key security; digital video recording devices for recording DV; evidence storage facilities and procedures; forensics laboratories equipped to perform DV verification tests; and investigative analysis techniques and procedures. All of these elements are directed toward a successful courtroom evidentiary presentation. Evidence storage, investigative analysis, and courtroom procedures are not unique to digital video. While the DVA element is the subject of the present invention, a brief description of some of the other elements is helpful in providing a context for the DVA. These elements include the PKI, security token, and DV integrity verification.

A PKI is a system composed of procedures, software, and hardware that enable trust in the authenticity of public keys used for encryption, decryption, or digital signature verification. Trust in a PKI may be hierarchical or distributed. In a hierarchical system, person A is confident that the public key purported to belong to person B is in fact B's key because it is digitally signed by a trusted agent, namely a Certificate Authority (CA). The signed key, along with certain other information, is called a certificate. Furthermore, the CA is trusted because the CA's public key authenticity is certified by yet another certificate signed by the holder of the root key. Thus, the authenticity of every public key can be traced back to a root via the certificate chain. Consequently, compromise of the private root key will cause the entire trust chain to unravel.

In a distributed trust model, users A and B are locally registered to a CA, e.g., $CA_1$. Both A and B trust $CA_1$ and therefore trust certificates signed by $CA_1$. Person C belongs to a second PKI with a different CA, $CA_2$. Person A will trust certificates attributed to person C if $CA_1$ trusts $CA_2$.

To determine the more appropriate model for use in law enforcement, first consider the hierarchical case. When A and B are within the PKI of, for example, the USPIS, trust is essentially automatic. But if a person C outside the USPIS PKI is expected to trust the certificates, the hierarchical model is insufficient. Given that a judge and jury must ultimately trust the integrity and authenticity of the public key certificates, and that they will certainly not be members of the USPIS PKI, the hierarchical model breaks down. Therefore, the distributed model better fits the intended use.

Trust among CAs within the law enforcement community is established through common equipment, procedures, training, and professional integrity. What remains to determine are the PKI procedures and technology that will satisfy a judge that established legal criteria are met, the further measures needed to convince a jury beyond a reasonable doubt that the certificates are secure against tampering, and the extent to which the PKI may be distributed. It is likely that each locality responsible for evidence storage will also be responsible to operate as a local CA and for individuals normally trusted to store and protect evidence to be entrusted with logging and safeguarding certificates.

Private keys exist temporarily within a DV Evidence System while an agent is using a DVA. The private key associated with the agent's identity will be secured via a security token. A security token is a physically, electronically, and logically secure component that generates and stores key pairs and performs certain digital signature operations. It prevents anyone but the designated agent from accessing signing functions that associate the agent identity to DVA output data, thereby ensuring trace-ability of DVA output to a particular person. This is singularly important because the agent is the only person in the system trusted to hold private keys, and that agent's positive control over the keys must be demonstrable.

FIG. 2 is a flowchart showing how a DVA is used within a DV evidence system such as the one illustrated in FIG. 1. The process of using a DVA can be broken down into three sub-processes. First, a DVA, as well as a digital video recording device (or still camera) and a private key security token are issued 202 to an agent. For purposes of this description, an agent is a person responsible for gathering DV evidence. Next, the agent actually collects 204 DV evidence. Once the agent is done collecting DV evidence, the agent returns 206 the digital video recording device, DVA, and private key security token to the evidence storage facility. Each of these sub-processes is now further described.

Figure 3:
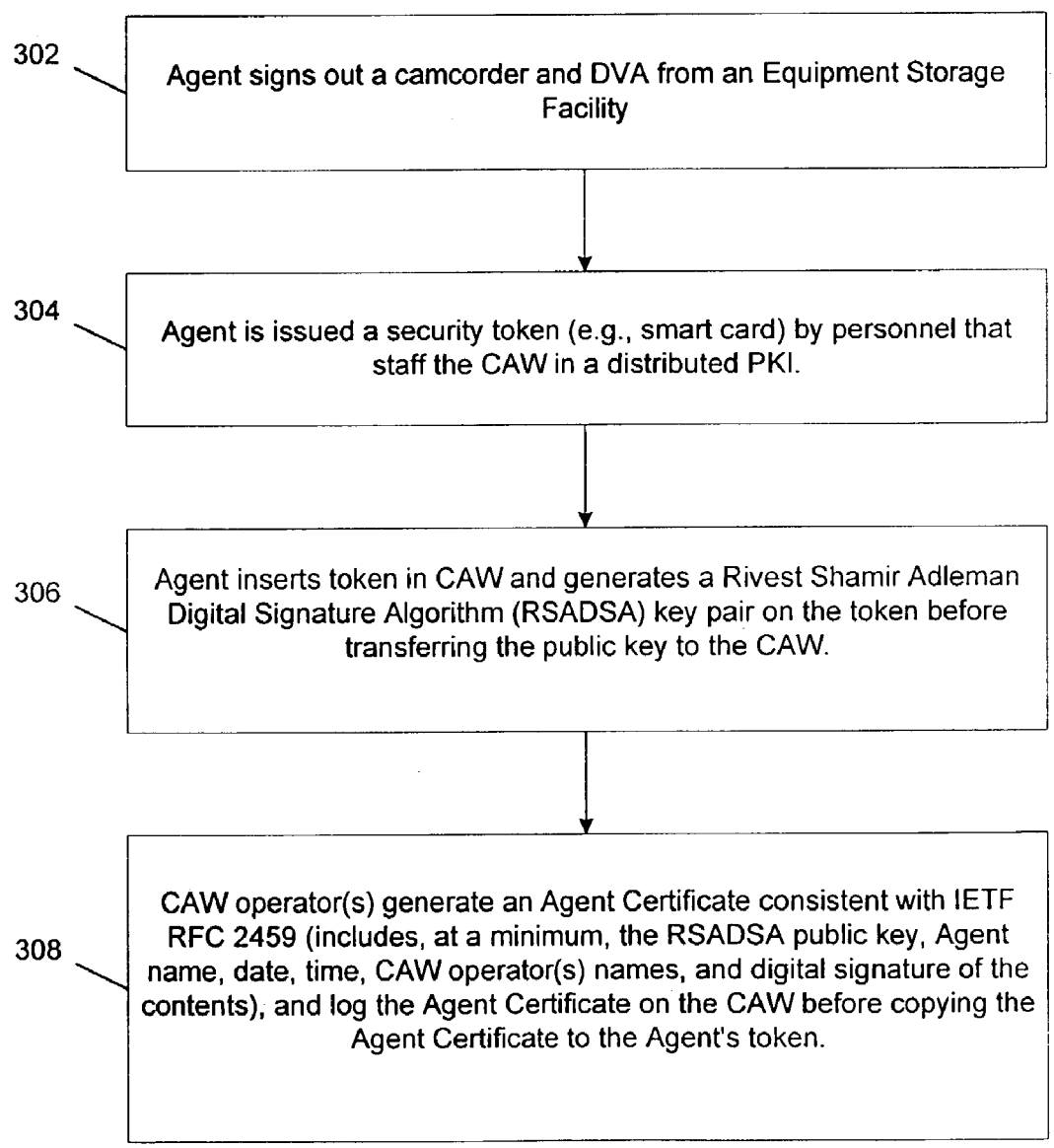
FIG. 3 is a flowchart further describing the steps involved in issuing a DVA and a security token.

FIG. 3 is a flowchart further describing the steps involved in issuing a DVA and a security token to an agent. When an agent wishes to use a DVA to support DV evidence collection, the agent follows rigorous procedures designed to ensure the chain of custody of and confidence in any DV evidence to be gathered. The agent signs out a digital video recording device and DVA from an equipment storage facility 302 that is manned by trained and trusted personnel that are part of the evidentiary chain of custody. The personnel that staff the CAW in a distributed PKI then issue the agent a security token 304. As described in box 306, the agent will insert the security token in the CAW and generate a Rivest Shamir Adleman Digital Signature Algorithm (RSADSA) key pair on the token. Next the public key is transferred to the CAW where the CAW operators will generate an agent Certificate 308 consistent with IETF RFC 2459. The agent Certificate includes, at a minimum, the RSADSA public key, agent name, date, time, CAW operators' names, and digital signature of the contents. The CAW operators also log the agent Certificate on the CAW and copy the agent Certificate to the agent's security token. The agent Certificate will become evidence and will be treated with the same procedures as other evidence. The copy held in the CAW will be the authoritative version. So far, the DVA itself has not been used.

Figure 4:
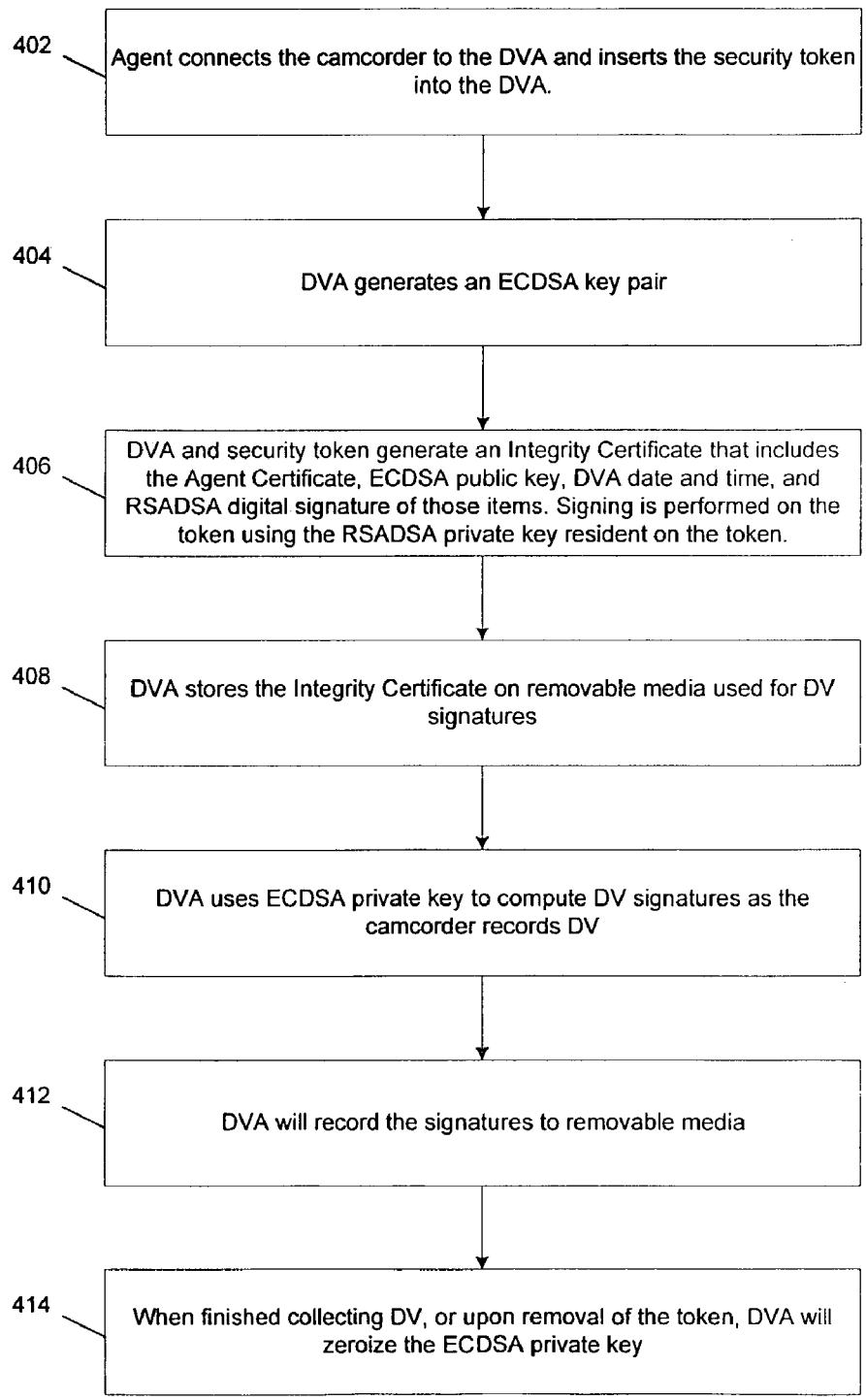
FIG. 4 is a flowchart further describing the steps involved in collecting DV using the DVA in conjunction with a typical digital video recording device.

FIG. 4 is a flowchart further describing the steps involved in collecting DV using the DVA in conjunction with a typical digital video recording device. When onsite and ready to collect DV evidence, the agent follows the procedures below. First, the agent will connect the video recording device to the DVA and insert the token in the DVA 402. Then, the DVA will generate an ECDSA key pair 404. Next, the DVA and token will generate an Integrity Certificate 406 that includes the Agent Certificate, ECDSA public key, DVA date and time, and RSADSA digital signature of those items. Signing is performed on the token using the RSADSA private key resident on the token. This is followed by having the DVA store the Integrity Certificate on the removable media used for DV signatures 408. The DVA will use the ECDSA private key to compute DV signatures as the video recording device records DV 410 and will record the signatures to removable media 412. When finished collecting DV, or upon removal of the token, the DVA will zeroize the ECDSA private key 414.

Figure 5:
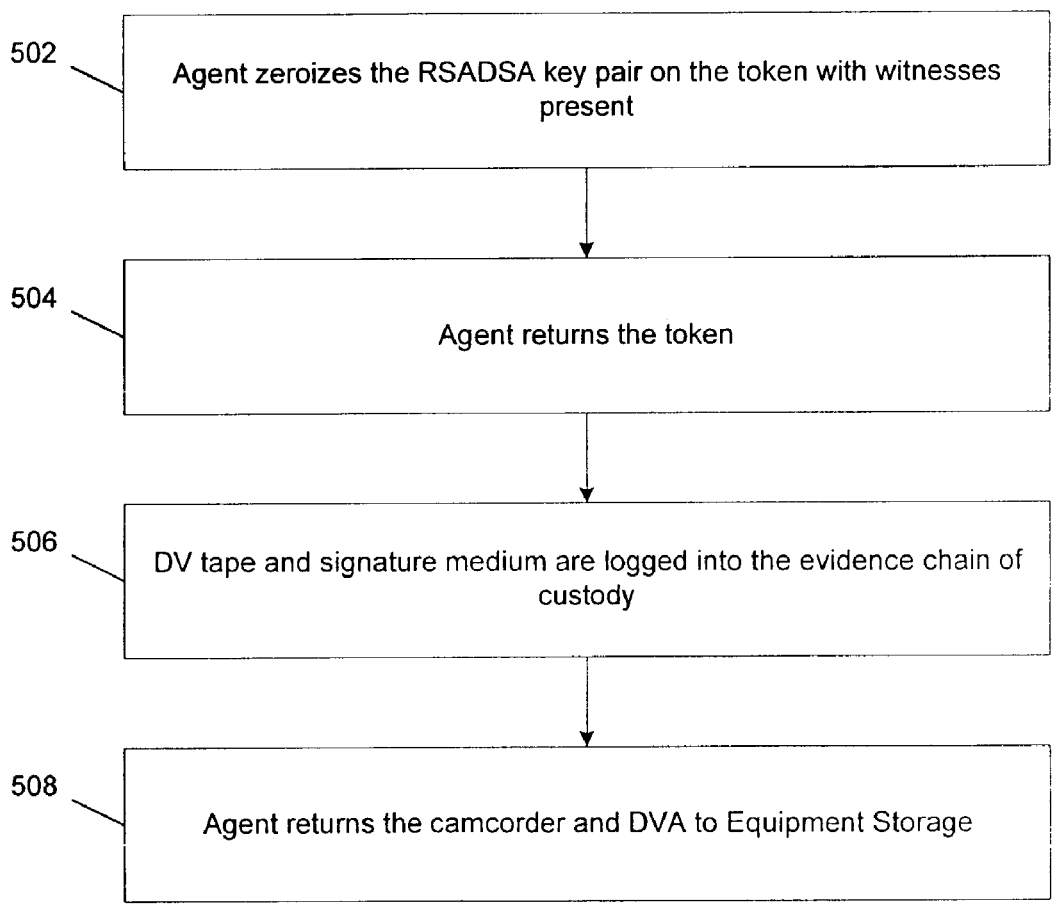
FIG. 5 is a flowchart further describing the steps involved in returning a DVA and a security token once DV collection is complete.

FIG. 5 is a flowchart further describing the steps involved in returning a DVA and a security token once DV collection is complete. When the agent returns the DVA and token to storage, the Agent will zeroize the RSADSA key pair on the token 502. It is recommended that this be witnessed and logged by the CAW operators. The Agent will then return the token 504. The DV tape and signature medium will be logged into the evidence chain of custody 506 with working copies made as needed. The Agent will then return the video recording device and DVA to Equipment Storage 508.

Figure 6:
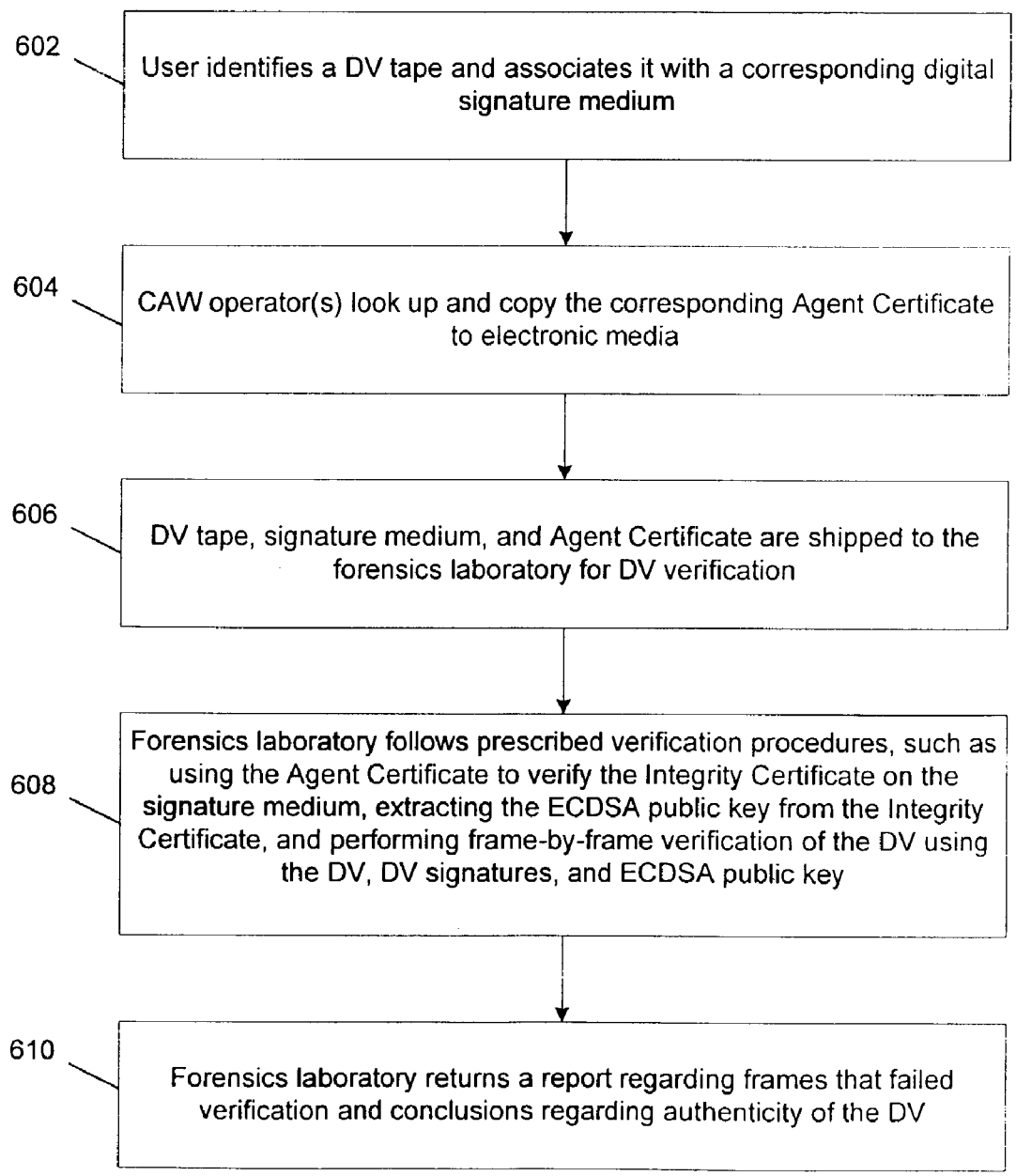
FIG. 6 is a flowchart further describing the steps involved verifying the integrity of DV.

FIG. 6 is a flowchart describing the steps involved verifying the integrity of DV. DV integrity verification is a process wherein DV evidence is compared to DVA-generated digital signatures to demonstrate that the DV is unaltered, or alternatively, to identify altered sections of the evidence. Digital signatures allow a frame-by-frame determination of DV data integrity. Integrity verification failure may be the result of record errors, media defects, playback errors, or intentional modifications. The integrity verification process does not discern the cause of a frame verification failure. Frames that cannot be verified are considered unsuitable for use as evidence.

The DVA itself is not required or used in the DV integrity verification process. To verify the integrity of DV evidence on those occasions when the DV is challenged, the DV tape and associated signature medium relevant to an investigation are identified 602. The CAW operators look up and copy the corresponding Agent Certificate to electronic media 604. The DV tape, signature medium, and Agent Certificate are then transferred to a forensics laboratory for DV verification 606. The forensics laboratory follows prescribed verification procedures 608, such as using the Agent Certificate to verify the Integrity Certificate on the signature medium, extracting the ECDSA public key from the Integrity Certificate, and performing frame-by-frame verification of the DV using the DV, DV signatures, and ECDSA public key. The forensics laboratory then generates a report 610 to be stored in the secure evidence facility regarding frames that failed verification and conclusions regarding the authenticity of the DV.

Figure 7:
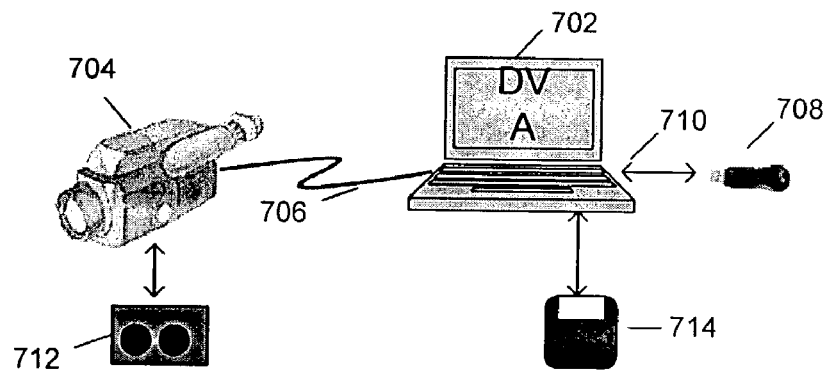
FIG. 7 illustrates a physical architecture for the DVA within a DV evidence system.

Up to this point, the overall DV evidence system has been discussed. The DVA itself now becomes the focus of the description. FIG. 7 illustrates a physical architecture for a DVA within a DV evidence system. The DVA 702 is illustrated as a laptop computer and is connectable to a digital video recording device 704 via, for instance, an IEEE-1394 (fire-wire) interface 706. A security token 708 is connectable to the DVA via, for instance, a universal serial bus (USB) interface 710, to provide the private key security token functionality described earlier. As the digital video recording device records DV to a tape 712, the DVA simultaneously generates and records digital signatures for the DV frames to a removable digital signature medium 714. The DV tape 712 and digital signature medium 714 both comprise evidence.

Figure 8:
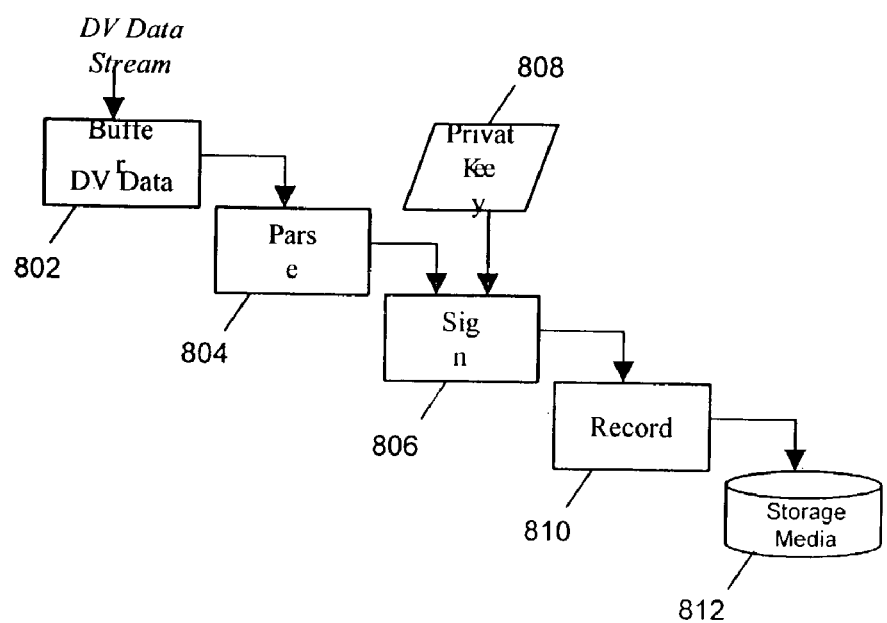
FIG. 8 illustrates the core DVA functions.

The core DVA functions are shown in FIG. 8. DV enters the DVA from a digital video recording device at approximately 30 frames per second with 120,000 bytes per frame. The first DVA core function is to buffer 802 that input stream into frames for processing downstream. To keep pace with the frame rate for real-time operation, this sets the upper bound on processing time for all downstream functions equal to the time required to receive one frame, or 33 ms. The second DVA core function is to parse 804 the DV frame. At a minimum, the frame will be parsed into video, audio, and control blocks representing the DVA and the digital video recording device. The control block corresponding to the digital video recording device includes a timecode parameter, a clock parameter, a calendar parameter, and a digital video recording device identification parameter. The control block corresponding to the DVA includes a DVA clock parameter and a digital video recording device status parameter Each block will be passed to a Sign function 806. Sign function 806 applies a digital signature algorithm compliant with FIPS PUB 186-2 and, if separate hashing is needed, FIPS PUB 180-1. Signing uses the ECDSA private key 808. Sign function 806 reduces the data rate from 120,000 bytes/33 ms to approximately 200 bytes/33 ms for subsequent functions. The last core DVA function is to record 810 the digital signatures to a suitable removable storage medium 812. In addition, the Integrity Certificate described earlier is also recorded.

The DVA functions performed on each frame of data are accomplished in less than 33 ms to keep pace with the incoming DV data. Moreover, the DVA maintains an internally stored activity log to aid in security audits. The log contains one entry for each on-off cycle of the DVA. At a minimum, the log entry will comprise the date and time powered on, the date and time powered off, the Agent Certificate, and an RSADSA signature. The log file is accessible by commanding the DVA to write it to the removable medium and subsequently viewing the file on a computer. In practice, the internal hard drive should be large enough to hold 2000 log entries (approximately equivalent to one on-off cycle per day for 5 years).

The DVA includes several interfaces used for specific input and output purposes. Each of these interfaces, software or hardware, are also coupled to a processor within the DVA. The DVA includes a display for providing textual and graphical information to an agent or other user of the system. A keyboard, mouse, or other forms of input devices are included to allow a user to input data. A security token hardware interface is employed that allows for 2-way communication between the security token and the DVA. In addition, there are software application programming interfaces (APIs) used to achieve the data transfers between the security token and the DVA. Moreover, an image transfer hardware interface is employed that allows for 2-way communication between a digital video recording device and the DVA including the transfer of DV data from the digital video recording device to the DVA, the transfer of digital video recording device state information to the DVA, and digital video recording device state inquiries from the DVA to the digital video recording device.

Figure 9:
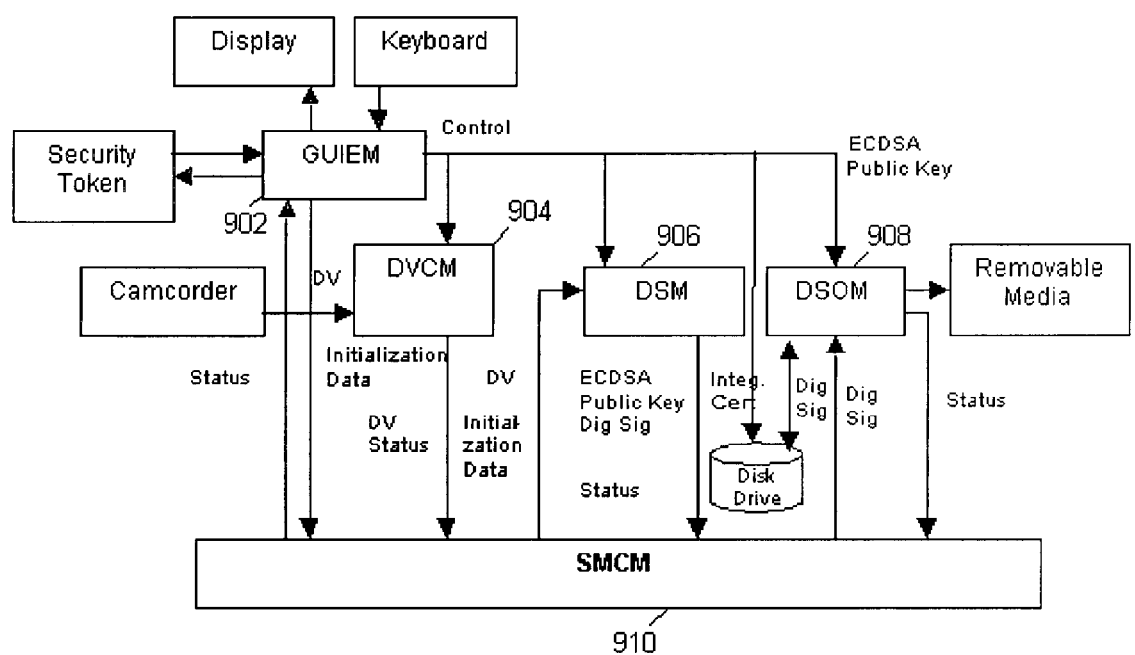
FIG. 9 illustrates the functions and functional data flow for software within the DVA.

FIG. 9 illustrates the functions and functional data flow for software within the DVA. The DVA reads DV data from a digital video recording device; parses the DV data into elements representing video, audio, control, and timing data; and then creates digital signatures that can be used to validate the original DV tape. The digital signatures are output to a computer-compatible removable storage media. The major functions of the DVA have been decomposed along functional lines as shown in FIG. 9. The major functions are the Graphic User Interface Executive Module (GUIEM) 902, Digital Video Capture Module (DVCM) 904, Digital Signature Module (DSM) 906, Digital Signature Output Module (DSOM) 908, and Shared Memory Communications Module (SMCM) 910. To permit the multitasking operation of these functions, the modules operate as separate routines with shared memory providing the communications data path.

The GUIEM 902 provides the main monitoring function for all of the modules. In addition, the GUIEM acts as an Executive Module and performs all module initialization for the remaining DVA modules. The GUIEM 902 is the primary user control for the user interface with the security token and user entry of case data. Finally, the GUIEM 902 is responsible for sending commands to the other modules to terminate their operation.

The DVCM 904 communicates directly with the IEEE 1394 communications bus to monitor the status of the digital video recording device, report the status to GUIEM 902, and extract the DV data. The DVCM 904 double buffers the DV data so that no data will be lost due to the varying computational loads of each DVA module. The DVCM 904 also has the capability of receiving remote termination requests from the GUIEM 902.

The DSM 906 is responsible for generating an ECDSA key pair and creating digital signatures of elements of the DV frame. Data communications and control are performed using shared-memory buffers that have common pointers and semaphores with other DVA modules.

The DSOM 908 stores data generated by the DVA, such as certificates and digital signatures, to internal DVA disk and removable media. The disk will hold three types of datasets: (1) DVA-specific information that has data pertaining to the agency collecting the video, case information, agent information, time and date, security level, case number, DV tape ID number; (2) DVA Integrity Certificate for the validation of the digital signature data; and (3) DVA digital signature data.

Communications between modules is accomplished by creating shared-memory buffers. The SMCM 910 controls the arbitration of the shared resources. Multiple shared-memory resources are required for communications between all modules. Large data buffers are supplied so that module timing differences are minimized and no module near the front of the data pipeline is waiting on a following module to complete its operation.

The GUIEM 902 controls and reports on all of the other modules in the DVA. As part of the control function, the GUIEM 902 launches support functions using the Windows OS Spawn command. The GUIEM 902 also declares common shared-memory variables using predefined names between all of the support modules. Shared memory will include command and status buffers and data buffers as required by the interface between these modules. In addition, the GUIEM 902 has the capability to explicitly set a class of event flags that will be used to signal the support tasks the command to gracefully terminate their operation.

During normal operation, the GUIEM 902 accepts commands via mouse and keyboard and then interprets those inputted commands into commands sent through the shared-memory interface (SMCM) 910. Support programs will send status and result data through the shared memory. The data rate requirements of the module communications paths dictate the number of buffers required to support the data transfer. In the cases of high-speed transfer, multiple buffers will be provided; in time-dependent situations, the task requesting the shared-memory buffer will not wait if the buffer is not available. The GUIEM 902 also detects the addition or removal of a universal serial bus (USB) device as part of its communication with the security token.

The DVCM 904 directly monitors the DV video recording device and routes the extracted DV compressed data to the DSM 906 via a shared-memory buffer. In addition, the DVCM 904 sends periodic requests to the video recording device for timecode and status information. The module is also receptive to events generated by the XPE operating system upon addition or removal of a physical device, such as the video recording device. If the video recording device is powered down or up, causing the removal or addition of an IEEE 1394 device, an event is triggered. This event is used to detect a power failure or power-down of a video recording device during recording. The DVCM 904 uses a polling architecture to detect status changes in the video recording device (record/pause). The main DVCM routine spawns a thread (separate task) that will continuously poll the video recording device. Because the DV is being captured using a DirectX filtergraph, the filtergraph must be started and stopped in sync with the video recording device. The polling architecture will determine the status of the video recording device and then start or stop the capture filtergraph.

If the video recording device loses power during a capture session or the IEEE 1394 fire-wire cable is removed from the DVA, the filtergraph must be removed from the system properly. A failure to remove the filtergraph correctly will result in the inability of a new filtergraph to access the video recording device driver. For this reason, error conditions should result in graceful exit of the program (removing the filtergraph) and a message to the GUIEM 902 that announces the status of the capture. The GUIEM 902 will be responsible for starting a new task that resumes the capture process. Because the power-down or failure of the video recording device should also be recorded, the event should trigger a closure of the digital signature files. It is envisioned that the digital signature files could be started and stopped many times either by pressing the pause/record button on the video recording device or the video recording device loosing power. If the video recording device does lose power, the effect would be as if the video recording device is now paused, and the digital signature data will be written to the removable media.

Because losing power will result in the loss of the physical device driver (which removes the video recording device from the system), the DVCM 904 should detect the situation, remove the filtergraph, and then restart the loading process (which includes looking for the power-up of the video recording device). The power-up or -down of the video recording device should not affect any of the other modules, other than to trigger the DSOM 908 to complete the processing of digital signature for that record sequence.

The DSM 906 is the most computationally intensive part of the DVA system. The DSM 906 must start before the DVCM 904 because the DVCM 904 is the source of the data to be signed and the DSM 906 must be ready to receive the data generated by the DVCM 904. In addition, the DSM 906 must receive a formal ECDSA key pair request because the successful authentication of the DV data will depend on the presence of an ECDSA key pair. The GUIEM 902 first starts the DSM 906 and then requests that it generate an ECDSA key pair. The public key information is transmitted to the GUIEM 902 via a shared-memory interface (similar to the interface that is used for the DV data). The GUIEM 902 reads the public key and converts it into an Integrity Certificate using the Security Token. The ECDSA private key will be stored only in internal volatile memory and will be zeroized at program termination or when commanded to by the GUIEM 902. If the DVA system faces an error where power cycling the DVA is required (mishandling the video recording device connection), the ECDSA key pair will have to be regenerated.

During normal operation of the DVA, DV packets are received one frame at a time via the shared-memory buffer. In addition to the DV packet, clear index data is also received as part of the shared buffer. The DSM 906 will parse the DV data into control, audio, and video DIF blocks and then create four digital signatures. Because the four-signature process is computationally intensive, the shared buffers should be released as soon as the four raw digital signature input buffers are complete. Effectively, this would provide a third buffer for DV data so the DVCM 904 would then be free to proceed with loading new buffers and not risk data loss.

The resulting digital signatures are very small (224 bytes total per frame). The output digital signatures should be written to a large shared-memory buffer, queuing 1 minute of signatures prior to passing the data on to the DSOM 908. The size of the buffer is selected to minimize the effect of disk input/output on the DVA system. Multiple buffers are provided so that all disk input/output will not impact the availability of an output buffer.

The DSOM 908 creates a hard disk directory that holds all of a DV tape's digital signatures. The contents of the directory will also be simultaneously written to a removable disk. It is recommended that every time a DV tape is changed, a new blank removable media be put in the system. This will ensure that there will be sufficient disk space available for storing the DS data. In addition, the DSOM 908 implements error checking to verify the state of the removable media. An error message and audio alert will be directed toward the GUIEM 902 in response to the error condition.

The DSOM 908 continues operation even if there is no removable media available. The collected digital signatures and certificate data can be written to the removable media at a later time. In addition, the DSOM 908 implements the function of searching the disk for digital signature directories and reporting them to the GUIEM 902. The DSOM 908 also deletes old digital signature directories via GUIEM 902 command.

Shared memory 910 as implemented in the DVA is based on a shared memory class. The shared memory class becomes a data type that is declared for shared-memory interface defined in the system. Four basic elements of the shared memory 910 must be defined for each shared memory interface: (1) the name variable, which is used to form the name of the shared memory, events, and semaphores; (2) synchronization names for read and write; (3) number of buffers; and (4) the data structure of the individual buffer.

All data buffers are defined first before any other task. Therefore, the shared-memory buffer task is the first task to be started after the GUIEM 902 interface and the last task to be terminated prior to terminating the GUIEM 902 interface.

The DVA can be considered to have four operational states: initialization, normal operation, normal termination, and abnormal conditions. Each of these states is further described below.

Figure 10:
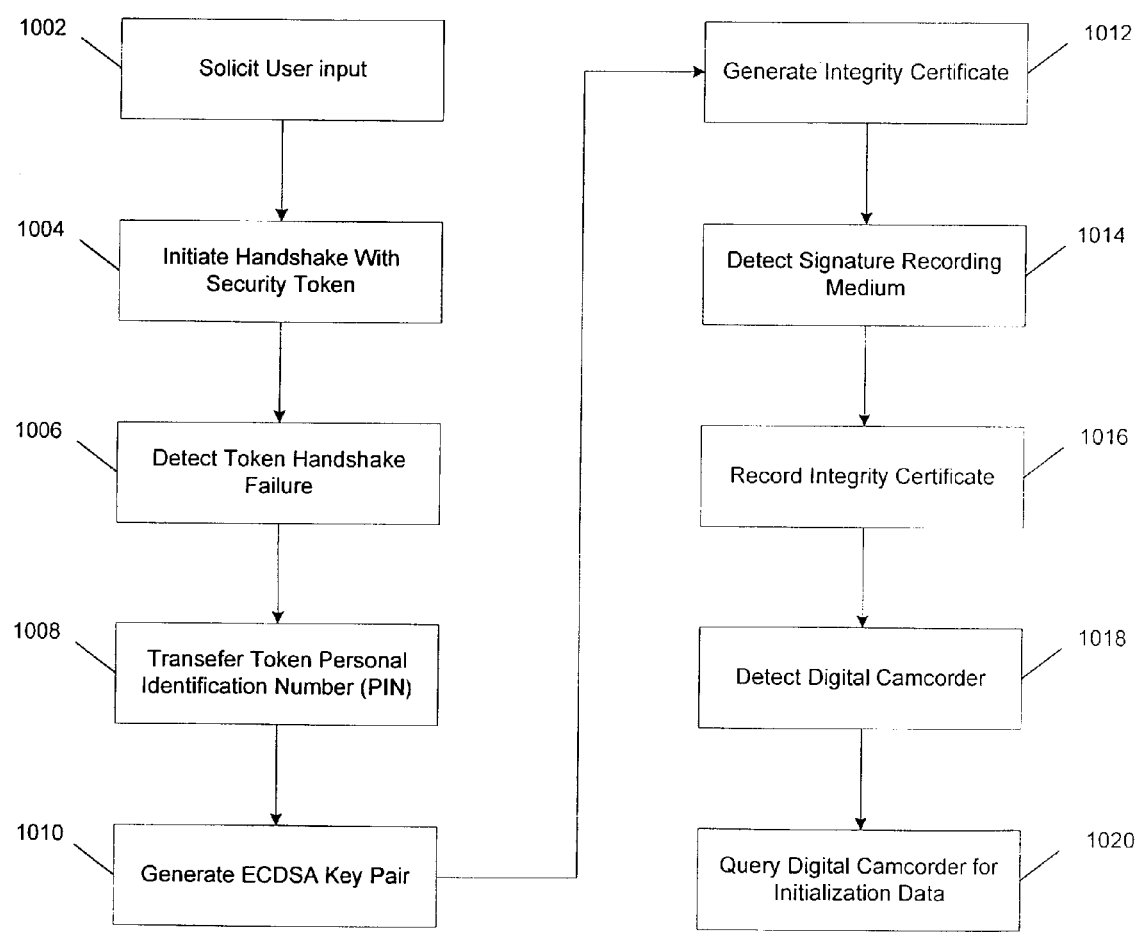
FIG. 10 is a flowchart describing the initialization state of the DVA.

FIG. 10 is a flowchart describing the initialization state of the DVA. The first step in the initialization process is to solicit user input 1002. The DVA shall request, via its GUIEM, that the user input, a user name, date or confirmation of displayed DVA date, time or confirmation of displayed DVA time, a case number, media identification numbers, and comments. The next step is to initiate a handshake with the security token 1004 that has been coupled with the DVA by an appropriate hardware interface in accordance with the appropriate API for the token. Next, the DVA detects if there is a failure to accomplish the token handshake 1006. If failure is detected, the DVA shall display a message instructing the user to insert the token and retry the handshake. The next step is to transfer the token personal identification number 1008. If the token handshake is successful, the token will need a personal identification number (PIN) to allow access to its functionality. Using the appropriate security API, the DVA accepts the PIN request from the token and displays a message instructing the user to type in the PIN where it is transferred to the security token. Once the security token is transferred, the DVA generates an ECDSA key pair 1010. In the next step, the DVA and security token generate an X.509 digital certificate 1012 containing the ECDSA public key. This is termed the Integrity Certificate. The DVA formats the certificate data in accordance with IETF RFC 2459, transfers the data to the token, receives the token-generated RSADSA signature of the certificate data, and appends the signature to complete the Integrity Certificate. Next, the DVA detects the presence of a removable recording medium 1014 for digital signatures. If the medium is not present, the DVA displays a message instructing the user to insert the medium. The DVA then periodically rechecks for media presence. The DVA then records the Integrity Certificate 1016 to the signature medium. Next, the DVA detects the presence of a digital video recording device 1018 over the IEEE-1394 interface. If the video recording device is not detected, the DVA displays a message instructing the user to plug in and turn on the digital video recording device. The DVA then periodically rechecks for digital video recording device presence. Lastly, the DVA queries the digital video recording device 1020, via the IEEE-1394, interface to obtain the digital video recording device date and time and the digital video recording device identification number (e.g., serial number).

Figure 11:
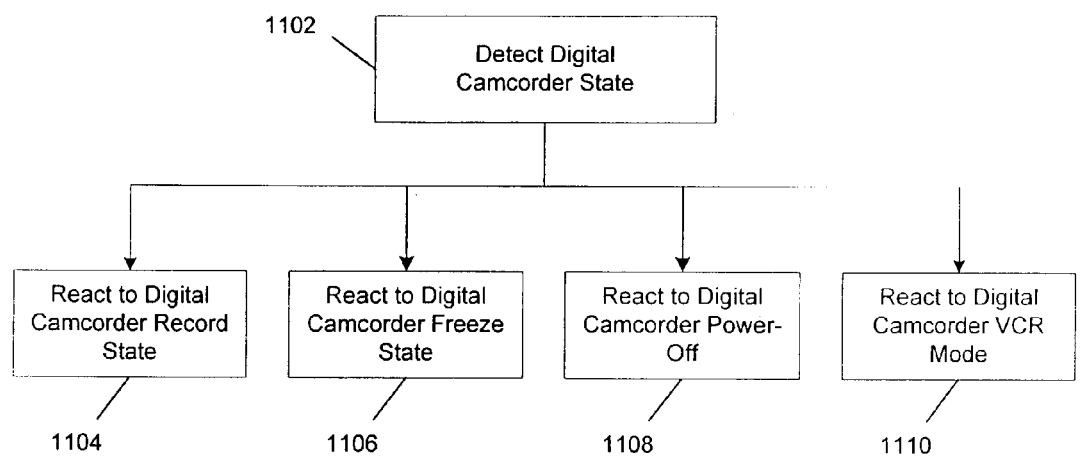
FIG. 11 is a state diagram describing the normal operation state of the DVA.

FIG. 11 is a state diagram describing the normal operation state of the DVA. Normal operation presumes successful completion of the initialization functions described above. The first step in normal operation mode is to detect the video recording device state 1102. The DVA detects the video recording device modes and operating states which include: record while in camera mode, freeze while in camera mode, power-off, and video cassette recorder (VCR) mode.

Next, the DVA reacts to the video recording device state. If the digital video recording device is in the record state 1104, then it parses DV data into frames. It then further parses each frame into portions for audio, video, and metadata (control data for both the DVA and digital video recording device). Next, it will sample the DVA clock and associate a time with each frame using the internal DVA clock. This is followed by computing ECDSA digital signatures for the DV audio, video, metadata and the DVA time. After which clear text and signatures are recorded. For each frame, the DVA records clear-text DV metadata and clear-text DVA time.

If the digital video recording device is in the freeze state 1106, then the DVA completes processing of all DV frames in memory, obtains the DVA time, generates an ECDSA signature of the time and pause flag, and records the clear-text time and pause flag and the signature to the signature medium.

The DVA then waits for a change in video recording device mode or state.

If the digital video recording device is powered-off 1108, then the DVA completes processing of all DV frames in memory, obtains the DVA time, generates an ECDSA signature of the time and a DVA-generated video recording device power-off flag, and records the clear-text time and DVA-generated video recording device power-off flag and the signature to the signature medium. The DVA then waits for a change in video recording device mode or state.

If the digital video recording device is in VCR mode 1110, then the DVA displays a message that the video recording device is in VCR mode and waits for a change in video recording device mode or state.

Figure 12:
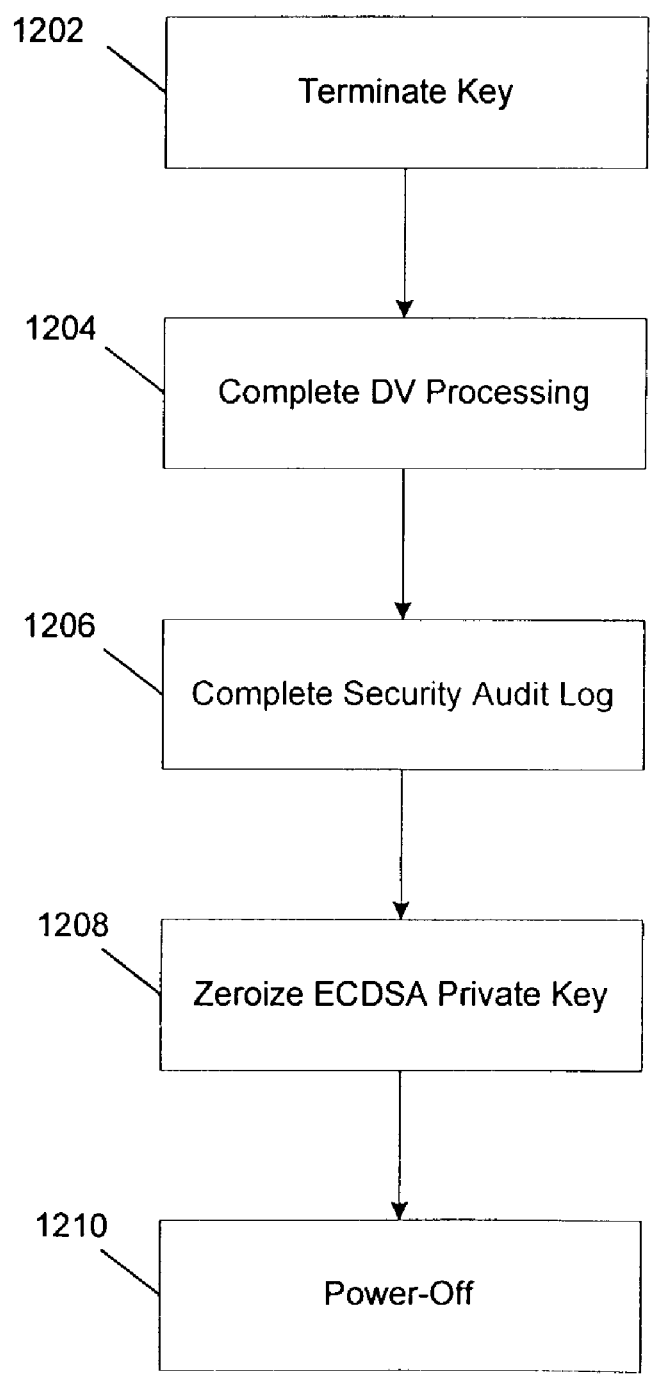
FIG. 12 is a flowchart describing the normal termination state of the DVA.

FIG. 12 is a flowchart describing the normal termination process of the DVA. To terminate DVA processing normally, the operator actuates a terminate key which can be a designated key, a software button, or a command to initiate termination functions 1202. When this action is initiated, the DVA completes processing 1204 of all frame data in memory that includes parsing of the frame(s), generating signatures for the frame blocks, and writing signatures to removable media. Next, the DVA completes a security audit log 1206 entry that includes concatenating the log entry data, transferring the data to the token for RSADSA signature, receiving the signature from the token, and writing the clear-text data and signature to the internal hard drive. The last step in normal termination of a DVA session is to zeroize ECDSA Private Key 1208 that involves overwriting the ECDSA private key with zeroes or random bits. At this point, the DVA can be powered off 1210.

Figure 13:
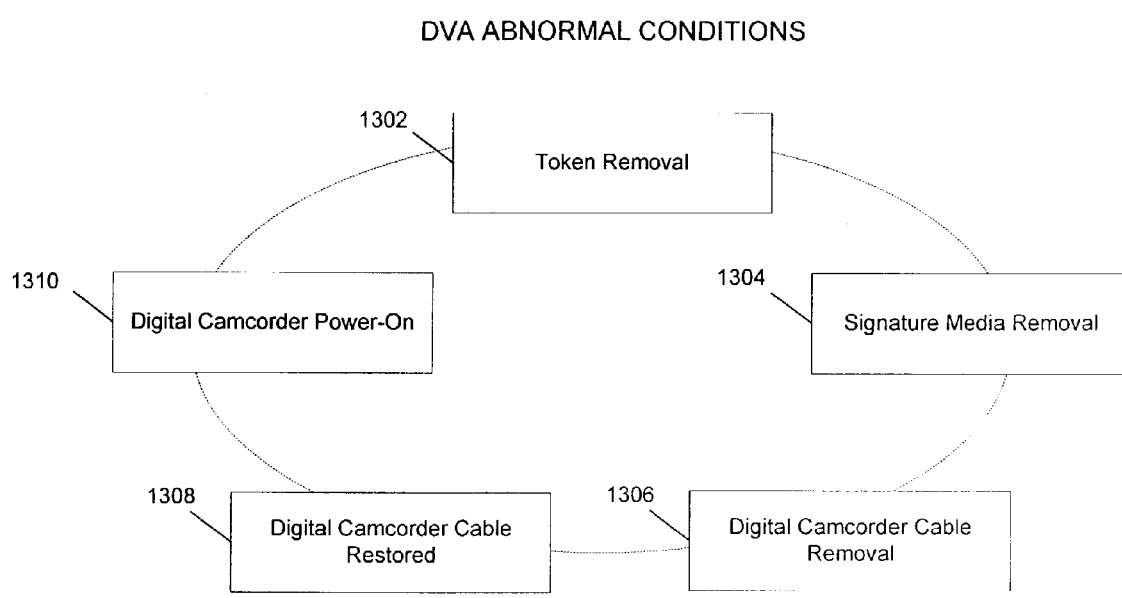
FIG. 13 is a state diagram describing the abnormal conditions state of the DVA.

FIG. 13 is a state diagram describing the abnormal conditions state of the DVA. There are several abnormal conditions that can occur during DVA operation. There are specific steps that can be taken to deal with certain abnormal conditions. One abnormal condition occurs when the security token is removed 1302. If the security token is removed during Initialization, Normal Operation, or Normal Termination, the DVA completes processing of all DV frame data in memory, zeroizes the ECDSA private key, displays a message to the user that the token has been removed and the DVA must be reinitialized, and powers itself off.

Another abnormal condition occurs when the signature media is removed 1304. If the removable signature medium is removed prior to Normal Termination/Power Off, the DVA continues all normal functions except for writing to the medium, records all generated data to the internal hard-drive, displays an alert to the user that the media drive is empty, and periodically queries the media drive for available medium.

Yet another abnormal condition occurs when the cable between the DVA and the digital video recording device is removed 1306. If the IEEE-1394 cable is removed, the DVA completes processing of all frame data in memory and displays a message that the video recording device input is missing and the DVA is waiting If the IEEE-1394 cable is restored 1308 or plugged into the DVA after an inadvertent removal, the DVA detects the digital video recording device input and resumes normal processing.

Still yet another abnormal condition occurs when the video recording device is powered on after an inadvertent power-off 1310. If the video recording device is powered on after an inadvertent power-off, the DVA detects the video recording device input and resumes normal processing.

It is important to note that the text above described the present invention in terms of using a DVA in conjunction with a digital video recording device. While this may be the most obvious of implementations, it is not the only possible implementation. The present invention can be used in conjunction with a digital still camera as well. In addition, the connections of various elements of the DVA to other components can be achieved using other suitable interfaces and cabling that is well known in the art. Thus, the specific interfaces are not intended to limit the present invention in any way.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A system for recording digital signatures associated with recorded digital video wherein the digital signatures are used to authenticate the recorded digital video, the system comprising:
    a digital video authenticator (DVA) device adapted to receive digital video from the digital video recording device on a real time frame-by-frame basis; and
    a security token including an RSADSA private key and an agent certificate, the agent certificate comprising information identifying an agent and an RSADSA public key,
    wherein
prior to recording digital video,
    the security token and digital video recording device are operably connected to the DVA;
    an ECDSA public/private key pair is created within the DVA using the security token;
    an integrity certificate including the ECDSA public key is created and stored on a digital signature removable storage medium within the DVA; and
while the digital video recording device records digital video to its own storage medium, the DVA:
    receives and buffers the digital video being recorded by the digital video recording device on a real time frame-by-frame basis;
    parses each frame of the buffered digital video into a video block, an audio block, a digital video recording device control block, and a DVR control block;
    generates a digital signature for each digital video block of data using the ECDSA private key; and
    records the digital signatures to the removable storage medium within the DVA.

2. The system of claim 1 wherein the digital video recording device control block of data is comprised of a timecode parameter, a clock parameter, a calendar parameter, and a digital video recording device identification parameter.

3. The system of claim 1 wherein the DVA control block of data is comprised of a DVA clock parameter and a digital video recording device status parameter.

4. The system of claim 1 further comprising an independent processing device operably connectable with the DVA removable storage medium for authenticating digital signatures associated with recorded digital video wherein the independent processing device:
    accesses the agent certificate and authenticates the integrity certificate using the RSADSA public key included in the agent certificate;
    receives and couples with the DVA removable storage medium containing the integrity certificate and digital signatures generated by the DVA;
    authenticates the digital signatures on the DVA removable storage medium using the ECDSA public key included in the integrity certificate; and
    performs a frame-by-frame comparison with the associated digital video recorded by the digital video recording device thereby verifying the authenticity of the recorded digital video.

5. A method of recording and authenticating digital video comprising:
    a pre-recording process comprised of:
        provisioning a security token with an RSADSA public/private key pair; and
        generating an agent certificate on the security token, the agent certificate comprising information identifying an agent and the RSADSA public key;
        operably connecting the security token with a digital video authenticator (DVA) device;
        generating an ECDSA public/private key pair within the DVA;
        generating an integrity certificate including the ECDSA public key;
    a recording process comprised of:
        operably connecting a digital video recording device to the DVA and while the digital video recording device records digital video to its own storage medium, the DVA is:
        receiving and buffering the digital video being recorded by the digital video recording device on a real time frame-by-frame basis;
        parsing each frame of the buffered digital video into a video block, an audio block, a digital video recording device control block, and a DVR control block;
        generating a digital signature for each digital video block of data using the ECDSA private key; and
        recording the digital signatures to a storage medium within the DVA; and
    a post-recording process for authenticating the digital video recorded by the digital video recording device comprised of:
        using the RSADSA public key included in the agent certificate, authenticating the integrity certificate;
        using the ECDSA public key included in the integrity certificate, authenticating the digital signatures; and
        performing a frame-by-frame comparison with the associated digital video recorded by the digital video recording device thereby verifying the authenticity of the recorded digital video.

6. The method of claim 5 wherein the digital video recording device control block of data is comprised of a timecode parameter, a clock parameter, a calendar parameter, and a digital video recording device identification parameter.

7. The method of claim 5 wherein the DVA control block of data is comprised of a DVA clock parameter and a digital video recording device status parameter.

8. A digital video authenticator (DVA) apparatus that is connectable to a digital video recording device that records digital video (DV) and a security token, the DVA comprising:
 a shared memory communications module (SMCM) for providing a common communications capability;
 a digital video capture module (DVCM) having a hardware interface for coupling with the digital video recording device, the DVCM further coupled with the SMCM for monitoring the digital video recording device receiving and buffering DV generated by the digital video recording device;
 a digital signature module (DSM) coupled with the SMCM for parsing DV frame data, generating ECDSA public/private key pairs, creating an integrity certificate, and creating digital signatures of elements of a DV frame using the ECDSA private key;
 a digital signature output module (DSOM) coupled with the SMCM for storing data generated by the DVA; and
 a graphical user interface executive module (GUIEM) including a hardware interface for receiving and communicating with the security token, the GUIEM coupled with the SMCM for monitoring and managing the DVCM, DSM, and DSOM modules, said GUIEM capable of receiving and displaying data and issuing commands to the DVCM, DSM, and DSOM modules.

9. The DVA apparatus of claim 8 wherein the security token includes an RSADSA public/private key pair and an agent certificate including an RSADSA public key and data pertaining to an agent, the security token used in conjunction with the DVA to create the integrity certificate prior to DV collection, the integrity certificate including the ECDSA public key.

10. The DVA apparatus of claim 8 wherein, for each frame of DV, the DSOM stores to a removable storage medium DV metadata, a DVA time stamp, and the ECDSA digital signatures created by the DSM for each parsed frame of DV.

11. A system for recording and authenticating digital video comprising:
 means for provisioning a security token with an RSADSA public/private key pair; and
 means for generating an agent certificate on the security token, the agent certificate comprising information identifying an agent and the RSADSA public key;
 means for operably connecting the security token with a digital video authenticator (DVA) device;
 means for generating an ECDSA public/private key pair within the DVA;
 means for generating an integrity certificate including the ECDSA public key;
 means for operably connecting a digital video recording device to the DVA and while the digital video recording device records digital video to its own storage medium, the DVA is:
 means for receiving and buffering the digital video being recorded by the digital video recording device on a real time frame-by-frame basis;
 means for parsing each frame of the buffered digital video into a video block, an audio block, a digital video recording device control block, and a DVR control block;
 means for generating a digital signature for each digital video block of data using the ECDSA private key; and
 means for recording the digital signatures to a storage medium within the DVA; and
 means for using the RSADSA public key included in the agent certificate, authenticating the integrity certificate;
 means for using the ECDSA public key included in the integrity certificate, authenticating the digital signatures; and
 means for performing a frame-by-frame comparison with the associated digital video recorded by the digital video recording device thereby verifying the authenticity of the recorded digital video.

12. The system of claim 11 wherein the digital video recording device control block of data is comprised of a timecode parameter, a clock parameter, a calendar parameter, and a digital video recording device identification parameter.

13. The system of claim 11 wherein the DVA control block of data is comprised of a DVA clock parameter and a digital video recording device status parameter.

* * * * *